US010519873B2

(12) United States Patent  (10) Patent No.: US 10,519,873 B2
VanTassel et al.  (45) Date of Patent: Dec. 31, 2019

(54) AIR BYPASS SYSTEM FOR ROTOR SHAFT COOLING

(71) Applicant: General Electric Company, Schenectady, NY (US)

(72) Inventors: Brad Wilson VanTassel, Easley, SC (US); Peter Paul Pirolla, Greer, SC (US)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 15/092,008

(22) Filed: Apr. 6, 2016

(65) Prior Publication Data

US 2017/0292455 A1  Oct. 12, 2017

(51) Int. Cl.
*F02C 9/18* (2006.01)
*F01D 25/24* (2006.01)
(Continued)

(52) U.S. Cl.
CPC ............... *F02C 9/18* (2013.01); *F01D 5/08* (2013.01); *F01D 5/187* (2013.01); *F01D 9/065* (2013.01);
(Continued)

(58) Field of Classification Search
CPC .......... F01D 25/24; F01D 25/246; F01D 5/08; F01D 5/187; F01D 9/065; F02C 3/04;
(Continued)

(56) References Cited

U.S. PATENT DOCUMENTS 3,275,294 A   9/1966  Allen et al.
4,666,368 A * 5/1987  Hook, Jr. ............... F01D 5/082
                                                      415/115
(Continued)

FOREIGN PATENT DOCUMENTS

EP   1 045 114 A2   10/2000
EP   2 840 231 A1    2/2015
(Continued)

OTHER PUBLICATIONS

Extended European Search Report and Opinion issued in connection with corresponding EP Application No. 17164281.2 dated Jan. 26, 2018.
(Continued)

*Primary Examiner* — Jesse S Bogue
(74) *Attorney, Agent, or Firm* — Charlotte C. Wilson; James W. Pemrick

(57) ABSTRACT

An air bypass system for a gas turbine engine includes a nozzle for a gas turbine engine. The air bypass system includes the nozzle having an inner band, an outer band, and an airfoil extending between the inner band and the outer band. The airfoil defines an internal passage. A diaphragm includes an inner wall, a first rail, and a second rail, which collectively define a diaphragm cavity. The first rail defines a first rail aperture. A manifold is positioned in the diaphragm cavity. The manifold and the diaphragm collectively define a manifold chamber in fluid communication with the first rail aperture. A tube extends through the internal passage defined by the airfoil and into the diaphragm cavity. The tube is in fluid communication with the manifold chamber. Compressed air flows through the tube into the manifold chamber and exits the chamber through the first rail aperture.

12 Claims, 11 Drawing Sheets

(51) Int. Cl.
*F02C 3/04* (2006.01)
*F02C 7/18* (2006.01)
*F02C 9/16* (2006.01)
*F01D 5/08* (2006.01)
*F01D 5/18* (2006.01)
*F01D 9/06* (2006.01)
*F02K 3/02* (2006.01)
*F02C 6/08* (2006.01)

(52) U.S. Cl.
CPC ........... *F01D 25/24* (2013.01); *F01D 25/246* (2013.01); *F02C 3/04* (2013.01); *F02C 6/08* (2013.01); *F02C 7/18* (2013.01); *F02C 9/16* (2013.01); *F02K 3/02* (2013.01); *F05D 2220/32* (2013.01); *F05D 2250/71* (2013.01); *F05D 2260/231* (2013.01); *F05D 2260/606* (2013.01); *F05D 2260/96* (2013.01); *Y02T 50/676* (2013.01)

(58) Field of Classification Search
CPC ...... F02C 6/08; F02C 7/18; F02C 9/16; F02C 9/18; F02K 3/02; F05D 2220/32; F05D 2250/71; F05D 2260/231; F05D 2260/606; F05D 2260/96; Y02T 50/676
See application file for complete search history.

(56) References Cited

U.S. PATENT DOCUMENTS

| | | | |
|---|---|---|---|
| 5,352,087 A | 10/1994 | Antonellis | |
| 5,358,374 A | 10/1994 | Correia et al. | |
| 5,591,002 A | 1/1997 | Cunha et al. | |
| 5,749,701 A | 5/1998 | Clarke et al. | |
| 6,065,928 A * | 5/2000 | Rieck, Jr. | F01D 5/189 415/115 |
| 6,077,034 A * | 6/2000 | Tomita | F01D 5/08 415/110 |
| 6,397,604 B2 * | 6/2002 | Eldrid | F01D 5/088 60/782 |
| 6,398,485 B1 | 6/2002 | Frosini et al. | |
| 7,507,069 B2 * | 3/2009 | Kizuka | F01D 5/081 145/199.5 |
| 8,079,803 B2 * | 12/2011 | Takamura | F01D 5/081 415/115 |
| 8,562,285 B2 | 10/2013 | McCaffrey et al. | |
| 2004/0062637 A1 | 4/2004 | Dube et al. | |
| 2011/0070077 A1 | 3/2011 | Steiger et al. | |
| 2011/0189000 A1 * | 8/2011 | Vedhagiri | F01D 25/08 415/178 |
| 2013/0004295 A1 | 1/2013 | Naryzhny et al. | |
| 2017/0074106 A1 | 3/2017 | Scoffone et al. | |

FOREIGN PATENT DOCUMENTS

| | | |
|---|---|---|
| JP | H10-317908 A | 12/1998 |
| JP | 2015-004313 A | 1/2015 |
| WO | 96/13652 A1 | 5/1996 |
| WO | 2015/024800 A1 | 2/2015 |

OTHER PUBLICATIONS

Partial European Search Report and Opinion issued in connection with corresponding EP Application No. 17164281.2 dated Aug. 7, 2017.

* cited by examiner

AIR BYPASS SYSTEM FOR ROTOR SHAFT COOLING

FIELD OF THE TECHNOLOGY

The present disclosure generally relates to a gas turbine engine. More particularly, the present disclosure relates to an air bypass system for a nozzle for a gas turbine engine.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section includes one or more turbine nozzles, which direct the flow of combustion gases onto one or more turbine rotor blades. The one or more turbine rotor blades, in turn, extract kinetic energy and/or thermal energy from the combustion gases, thereby driving the rotor shaft. In certain configurations, each of one or more turbine nozzles define one or more internal passages that route cooling air therethrough and into a cavity where the rotor shaft is positioned to cool that turbine nozzle and the rotor shaft. Since the one or more turbine nozzles are in direct contact with the combustion gases and the cooling air is in direct contact with the one or more turbine nozzles, the temperature of the cooling air increases appreciably while flowing through the one or more turbine nozzles. This increase in the temperature of cooling air requires an increase in the volume of the cooling air to cool the rotor shaft, which may be undesirable.

BRIEF DESCRIPTION OF THE TECHNOLOGY

Aspects and advantages of the technology will be set forth in part in the following description, or may be obvious from the description, or may be learned through practice of the technology.

In one aspect, the present disclosure is directed to an air bypass system for a nozzle of a gas turbine engine. The air bypass system includes the nozzle having an inner band, an outer band, and an airfoil extending between the inner band and the outer band. The airfoil defines an internal passage. A diaphragm includes an inner wall, a first rail, and a second rail. The inner wall, the first rail, and the second rail collectively define a diaphragm cavity, and the first rail defines a first rail aperture. A manifold is positioned in the diaphragm cavity. The manifold and the diaphragm collectively define a manifold chamber in fluid communication with the first rail aperture. A tube extends through the internal passage defined by the airfoil and into the diaphragm cavity. The tube is in fluid communication with the manifold chamber. Compressed air flows through the tube into the manifold chamber and exits the chamber through the first rail aperture.

Another aspect of the present disclosure is directed to a gas turbine engine that includes a compressor section, a combustion section, and a turbine section. The turbine section includes a nozzle having a radially inner side wall, a radially outer side wall, and an airfoil extending between the radially inner side wall and the radially outer side wall. The airfoil defines an internal passage. A diaphragm includes an inner wall, and a first rail, and a second rail. The inner wall, the first rail, and the second rail collectively define a cavity, and the first rail defines a cooling aperture. A manifold is positioned in the cavity defined by the diaphragm. The manifold and the diaphragm collectively define a chamber in fluid communication with the cooling aperture. A tube extends through the internal passage defined by the airfoil and into the cavity defined by the diaphragm. The tube is in fluid communication with the chamber defined by the manifold and the diaphragm. Cooling air flows through the tube into the chamber defined by the manifold and the diaphragm and exits the chamber through the cooling aperture.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended Figs., in which.

Figure 1:
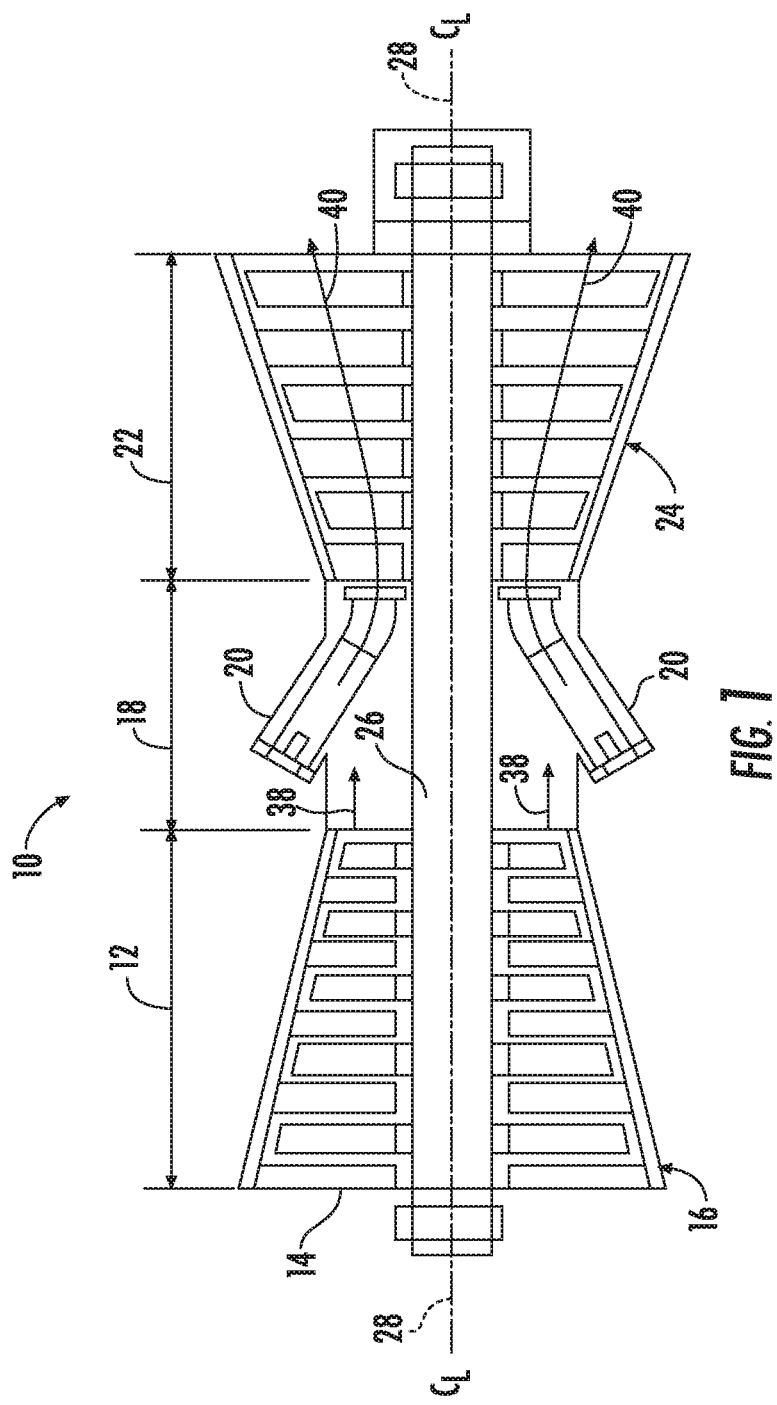
FIG. 1 is a schematic view of an exemplary gas turbine engine that may incorporate various embodiments disclosed herein.

Repeat use of reference characters in the present specification and drawings is intended to represent the same or analogous features or elements of the present technology.

DETAILED DESCRIPTION OF THE TECHNOLOGY

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although an industrial or land-based gas turbine is shown and described herein, the present technology as shown and described herein is not limited to a land-based and/or industrial gas turbine unless otherwise specified in the claims. For example, the technology as described herein may be used in any type of turbine including, but not limited to, aviation gas turbines (e.g., turbofans, etc.), steam turbines, and marine gas turbines.

Referring now to the drawings, FIG. 1 illustrates a schematic of an exemplary gas turbine engine 10 as may incorporate various embodiments disclosed herein. As shown, the gas turbine engine 10 generally includes a compressor section 12 having an inlet 14 disposed at an upstream end of an axial compressor 16. The gas turbine engine 10 further includes a combustion section 18 having one or more combustors 20 positioned downstream from the compressor 16. The gas turbine engine 10 also includes a turbine section 22 having a turbine 24 (e.g., an expansion turbine) disposed downstream from the combustion section 18. A rotor shaft 26 extends axially through the compressor 16 and the turbine 24 along an axial centerline 28 of the gas turbine engine 10.

Figure 2:
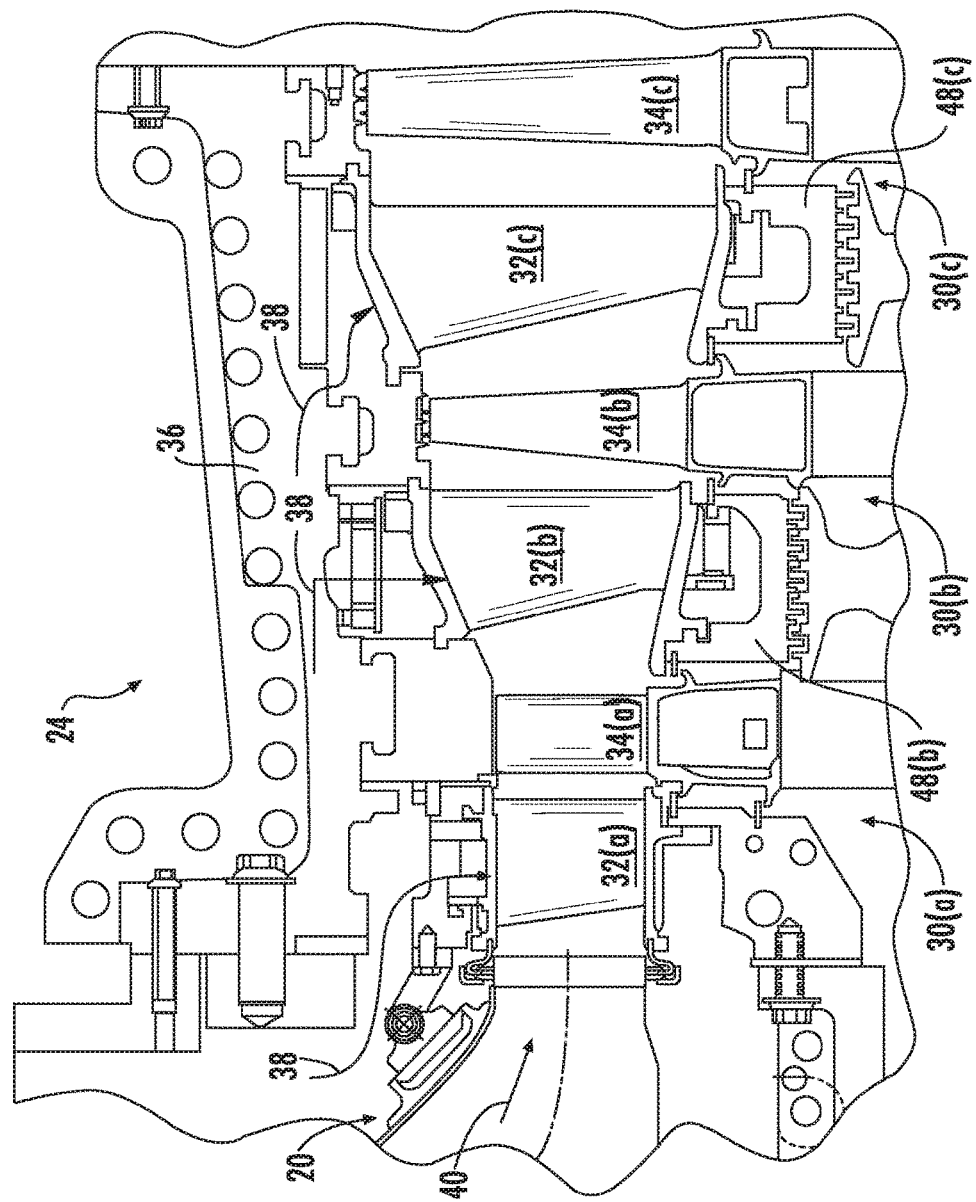
FIG. 2 is a cross sectional side view of an exemplary turbine section of a gas turbine engine that may incorporated in various embodiments disclosed herein.

FIG. 2 provides a cross sectional side view of an exemplary turbine 24 as may incorporate various embodiments disclosed herein. As shown in FIG. 2, the turbine 24 may include multiple turbine stages 30. For example, the turbine 24 may include three turbine stages 30, including a first stage 30(a), a second stage 30(b), and a third stage 30(c). The total number of turbine stages 30 may be more or less than three, and embodiments of the turbine section 22 should not be limited to three turbine stages unless otherwise recited in the claims.

As shown in FIG. 2, each stage 30(a-c) includes, in serial flow order, a corresponding row of turbine nozzles 32(a), 32(b), and 32(c) and a corresponding row of turbine rotor blades 34(a), 34(b), and 34(c) axially spaced along the rotor shaft 26 (FIG. 1). Each of the rows of turbine nozzles 32(b-c) are respectively coupled to a corresponding a diaphragm 48(b), 48(c). Although not shown in FIG. 2, the row of turbine nozzles 32(a) may also couple to a diaphragm. A casing or shell 36 circumferentially surrounds each stage 30(a-c) of the turbine nozzles 32(a-c) and the turbine rotor blades 34(a-c). The turbine nozzles 32(a-c) and the diaphragms 48(b-c) remain stationary relative to the turbine rotor blades 34(a-c) during operation of the gas turbine engine 10.

In operation, as shown in FIGS. 1 and 2, compressed air 38 from the compressor 16 is provided to the combustors 20 where it mixes with fuel (e.g., natural gas) and burns to provide a stream of hot combustion gases 40 that flows from the combustors 20 into the turbine 24. At least a portion of the compressed air 38 may be used as a cooling medium for cooling the various components of the turbine 24, such as the turbine nozzles 32(a-c) and the turbine rotor blades 34(a-c).

Figure 3:
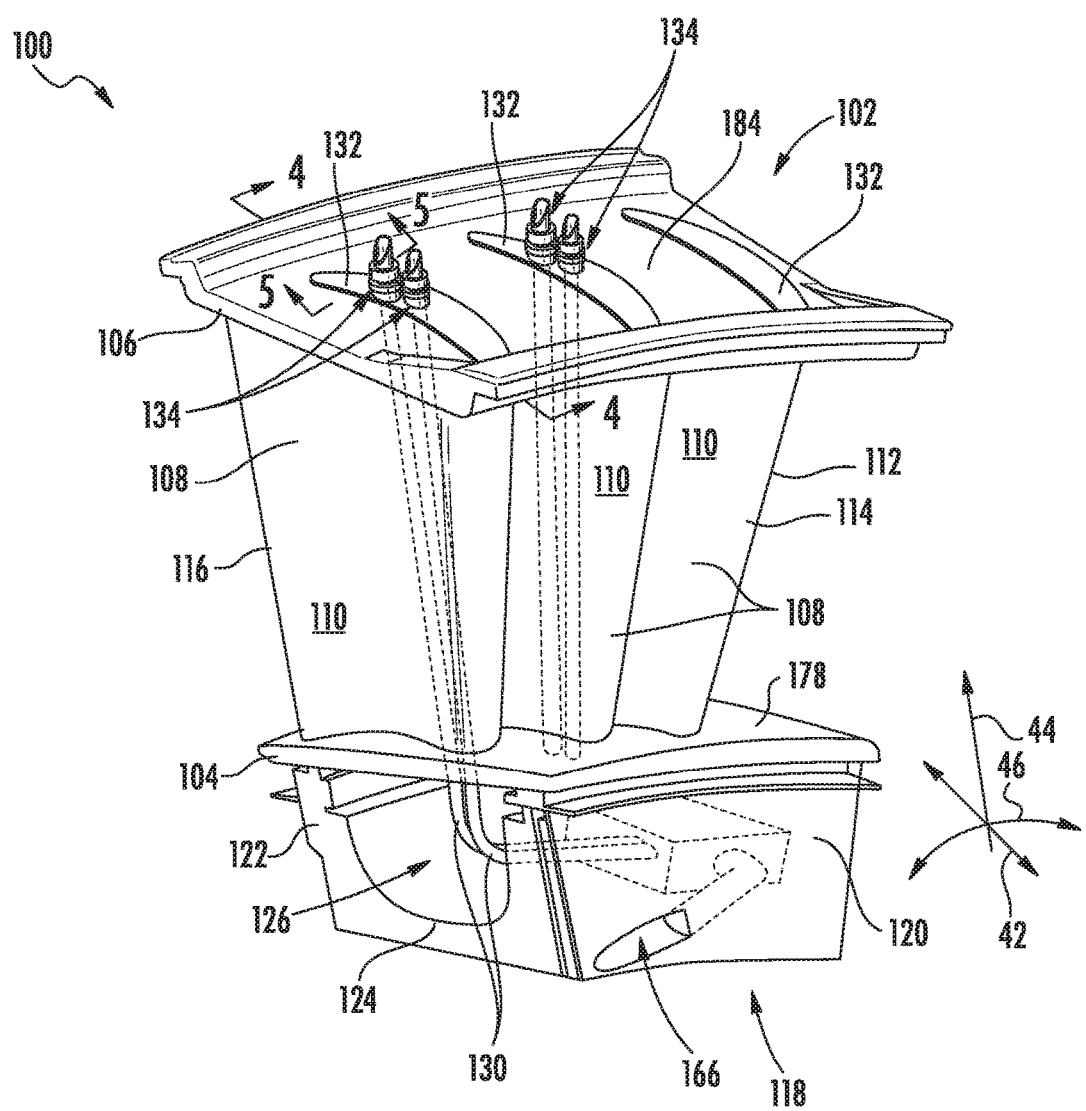
FIG. 3 is a perspective view of an exemplary turbine nozzle and an exemplary diaphragm that may incorporate one or more embodiments disclosed herein.
Figure 4:
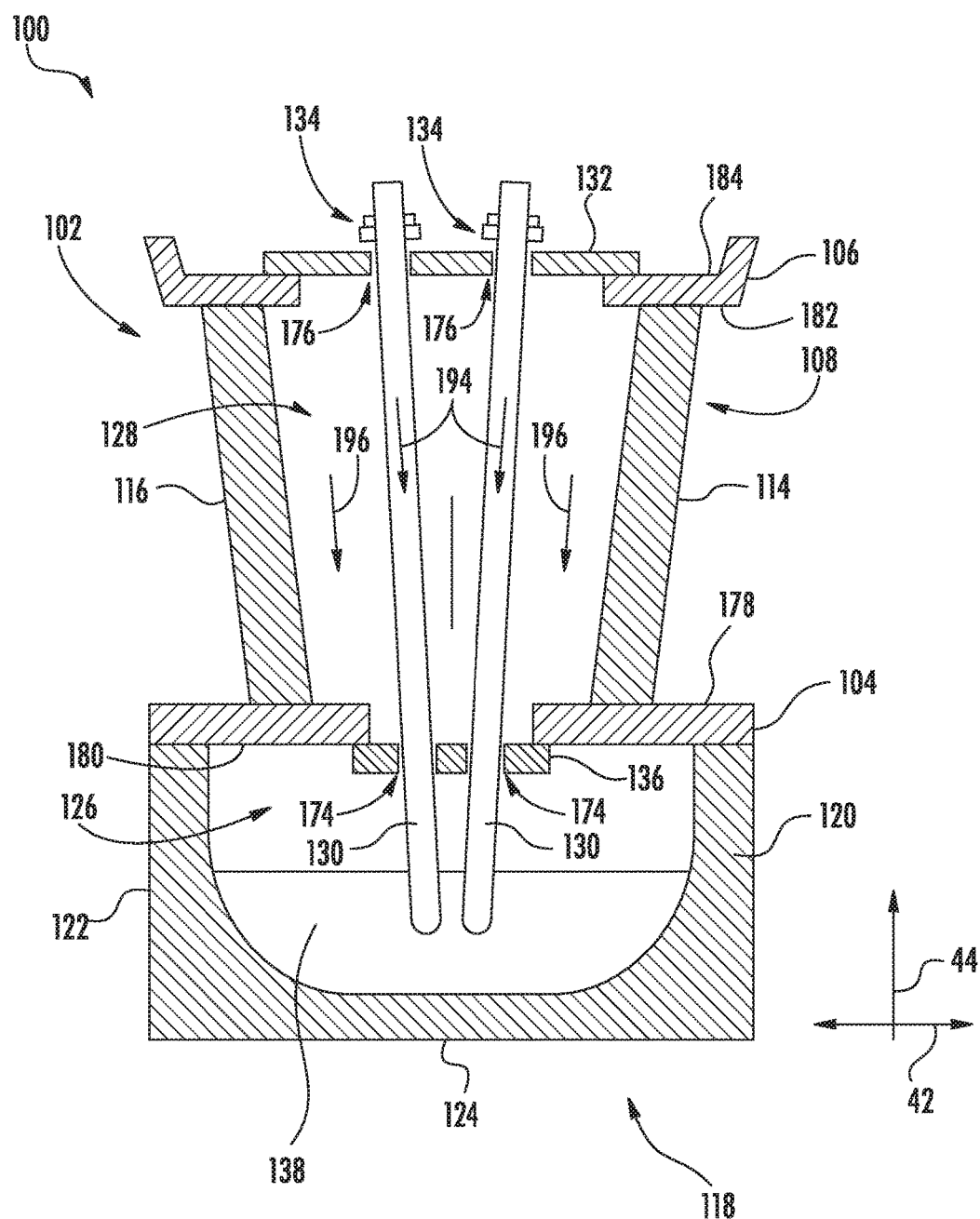
FIG. 4 is a cross-sectional view of the turbine nozzle and the diaphragm taken generally about line 4-4 in FIG. 3, illustrating various features thereof.

FIG. 3 is a perspective view of a cooling air bypass system 100 in accordance with the embodiments disclosed herein. FIG. 4 is a cross-sectional view of the cooling air bypass system 100 shown in FIG. 3. As will be discussed in greater detail below, the cooling air bypass system 100 isolates a portion of the compressed air 38 flowing through the rows of turbine nozzles 32(a-c) from exposure to the walls of the turbine nozzles 32(a-c) in contact with the combustion gases 40. In this respect, the portion of the compressed air 38 flowing through the cooling air bypass system 100 has a lower temperature after flowing through the turbine nozzles 32(a-c) than the portion of the compressed air 38 exposed to the walls of the turbine nozzles 32(a-c). As such, the cooling air bypass system 100 reduces the volume of compressed air 38 needed to cool the rotor shaft 26 (FIG. 1), thereby increasing the efficiency of the gas turbine engine 10.

As illustrated in FIGS. 3-4, the bypass system 100 defines an axial direction 42, a radial direction 44, and a circumferential direction 46. In general, the axial direction 42 extends along the axial centerline 28 of the gas turbine engine 10 (FIG. 1), the radial direction 44 extends orthogonally outward from the axial centerline 28, and the circumferential direction 46 extends concentrically around the axial centerline 28.

As shown in FIGS. 3-4, the bypass system 100 includes an exemplary turbine nozzle 102 as may be incorporated into the turbine 24 as shown in FIG. 2. The turbine nozzle 102 may correspond with or be installed in place of any of the turbine nozzles 32(a-c). In particular embodiments, the turbine nozzle 102 corresponds with the turbine nozzle 32(c) of the third stage 30(c), which may also be known in the industry as a stage three nozzle or S3N.

The turbine nozzle 102 includes an inner band 104 and an outer band 106 radially spaced apart from the inner band 104. Three airfoils 108 extend in span from the inner band 104 to the outer band 106. In this respect, the turbine nozzle 102 illustrated in FIGS. 3-4 is referred to in the industry as a triplet. Nevertheless, the turbine nozzle 102 may have only one airfoil 108 (i.e., a singlet), two airfoils 108 (i.e., a doublet), or four or more airfoils 108. The inner band 104 includes a gas side 178 and a back side 180 oriented radially inwardly from the gas side 178. Similarly, the outer band 106 includes a gas side 182 and a back side 184 oriented radially outwardly from the gas side 182. As shown in FIGS. 2-4, the gas side 182 of the outer band 106 and the gas side 178 of the inner band 104 respectively define inner and outer radial flow boundaries for the combustion gases 40 flowing at high velocity from the combustors 20 through the turbine 24. The inner and outer bands 104, 106 are preferably constructed from a nickel-based superalloy or another suitable material capable of withstanding the combustion gases 40.

Figure 5:
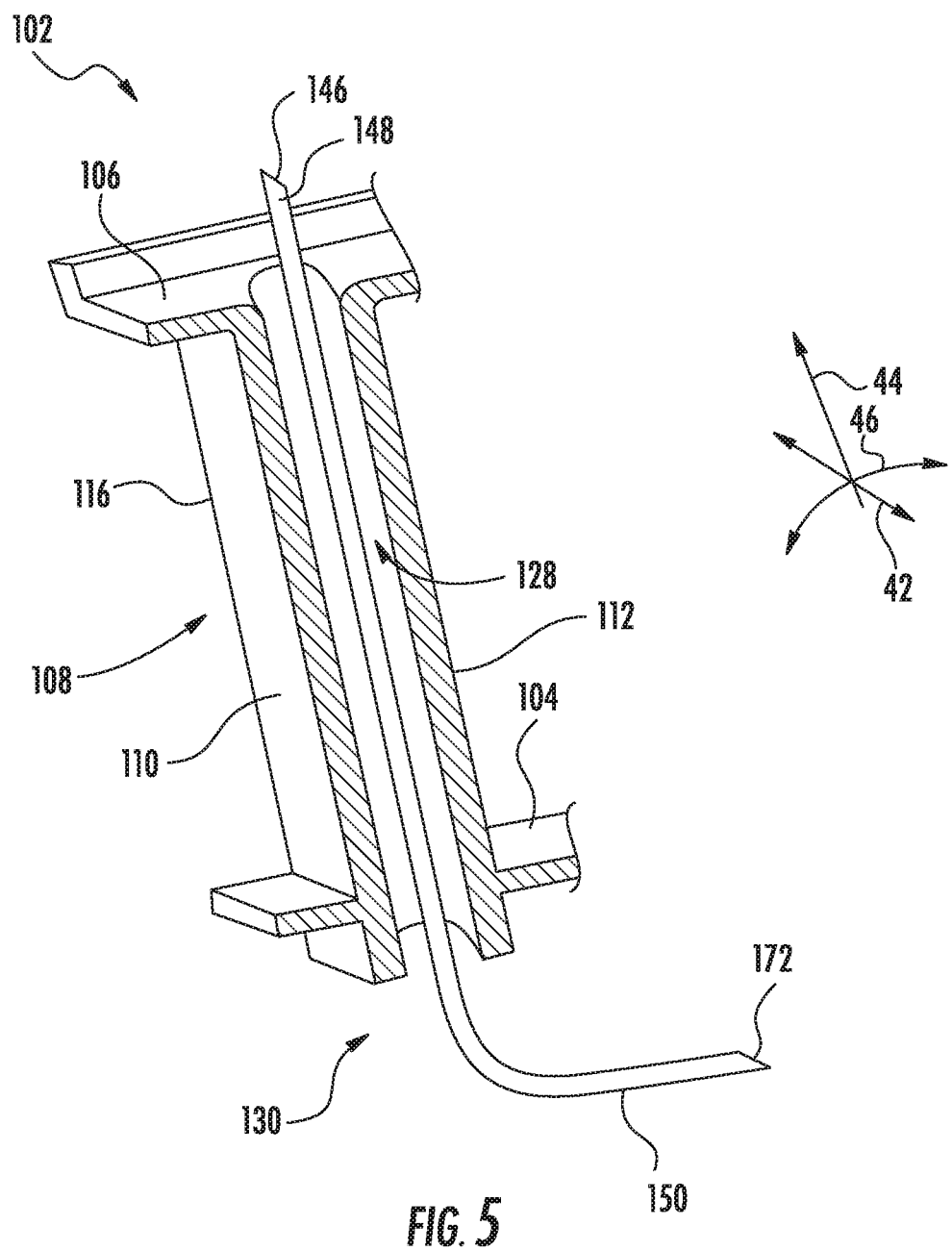
FIG. 5 is a cross-sectional view of the turbine nozzle taken generally about line 5-5 in FIG. 3, illustrating the relative positioning of the one or more tubes relative to a pressure side wall and a suction side wall of an airfoil of the turbine nozzle.

FIGS. 3-5 illustrate various features of the airfoils 108. Each airfoil 108 includes a pressure side wall 110 and an opposing suction side wall 112 extending between a leading edge 114 and a trailing edge 116. The pressure side and the suction side walls 110, 112 collectively define one or more internal passages 128 through which the compressed air 38 may flow. In the embodiment shown in FIGS. 3-5, the airfoil 108 defines a single internal passage 128 that permits cooling air to flow radially inward therethrough. Nevertheless, the airfoil 108 may define multiple internal passages (e.g., a serpentine passage) or circuits in other embodiments. The airfoils 108 are preferably constructed from a nickel-based superalloy or another suitable material capable of withstanding the combustion gases 40.

As shown in FIGS. 3-4, the bypass system 100 includes an exemplary diaphragm 118 as may be incorporated into the turbine 24 as shown in FIG. 2. The diaphragm 118 may correspond with or be installed in place of any of the diaphragms 48(b-c). In particular embodiments, the diaphragm 118 corresponds with the stage three diaphragm 48(c) of the third stage 30(c) of the gas turbine engine 10. Although, FIG. 3 shows only one diaphragm 118, several diaphragms 118 may be coupled together to form a ring that extends circumferentially around the rotor shaft 26 (FIG. 1)

The diaphragm 118 includes a first rail 120 and a second rail 122 axially spaced apart from the first rail 120. An inner wall 124 extends from a radially inner position of the first rail 120 and to a radially inner position of the second rail 122. In this respect, the first rail 120, the second rail 122, and the inner wall 124 collectively define a diaphragm cavity 126. If one or more diaphragms 118 extend circumferentially around the rotor shaft 26, the diaphragm cavity 126 may be annular. Furthermore, the first rail 120 defines a first rail aperture 166 that permits cooling air in the diaphragm cavity 126 to exit the diaphragm 118. In the embodiment shown in FIGS. 3-4, the diaphragm 118 has a U-shape; although, the diaphragm 118 may have any suitable shape as well.

The diaphragm 118 is positioned radially inwardly of the turbine nozzle 102 and is coupled thereto. Specifically, the first and the second rails 120, 122 of the diaphragm 118 engage (e.g., via a tongue and groove connection, welding, etc.) the inner band 104 of the turbine nozzle 102. In this respect, the inner band 104 forms the radially outer boundary of the diaphragm cavity 126. In some embodiments, the internal passage 128 of the airfoil 108 is in fluid communication with the diaphragm cavity 126 as shown in FIG. 4. In this respect, cooling air may flow from the internal passage 128 into the diaphragm cavity 126. Nevertheless, one or more inner plates 136 may restrict the flow of cooling air between the internal passage 128 of the airfoil 108 and the diaphragm cavity 126. Furthermore, one or more outer plates 132 may restrict the flow of the compressed air 38 disposed radially outwardly of the outer band 106 of the turbine nozzle 102 into the internal passage 128 of the airfoil 108.

Figure 6:
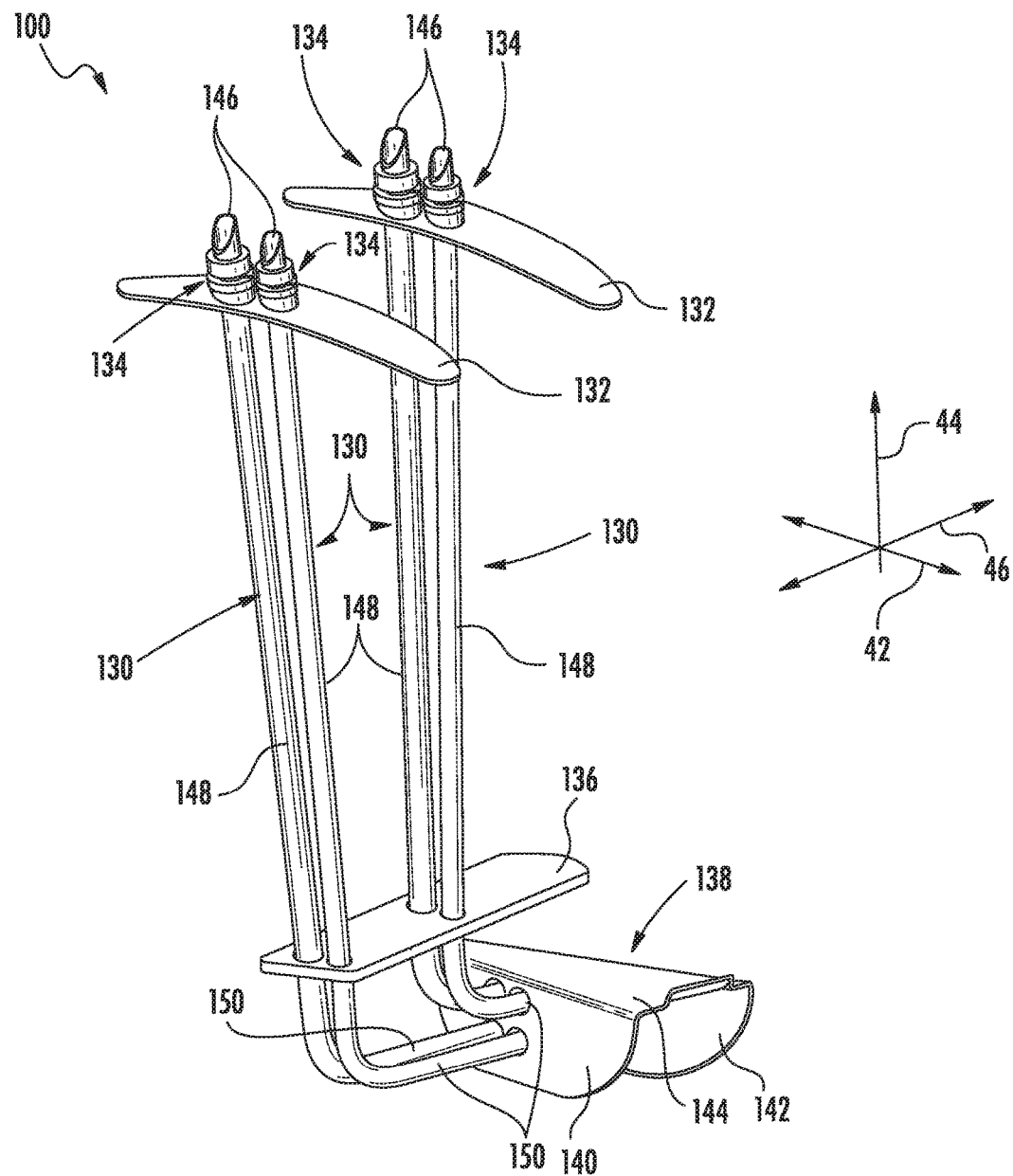
FIG. 6 is perspective view of various components of an air bypass system with the turbine nozzle and the diaphragm omitted for clarity.

FIG. 6 shows various components of the cooling air bypass system 100 with the turbine nozzle 102 and the diaphragm 118 removed for clarity purposes. As shown in FIGS. 3-4 and 6, the cooling air bypass system 100 includes one or more tubes 130, which permit the compressed air 38 to flow through the turbine nozzle 102 without contacting the pressure side or suction side walls 110, 112, In this respect, the one or more tubes 130 extend through the internal passage 128 of the airfoil 108 and into the diaphragm cavity 126. In the embodiment shown in FIG. 3, two tubes 130 extend through two of the three airfoils 108 in the turbine nozzle 102. Nevertheless, any suitable number of tubes 130 (e.g., one, three, etc.) may extend through any number of the airfoils 108 in the turbine nozzle 102 so long as at least one tube 130 extends through at least one of the airfoils 108 in the turbine nozzle 102.

Each of the tubes 130 includes a first portion 148 and second portion 150. The first portion 148 extends radially through the internal passage 128 defined by the airfoil 108, while the second portion 150 extends circumferentially through the diaphragm cavity 126. More specifically, the first portion 148 extends in the radial direction 44 from a first end 146 positioned radially outwardly from the outer band 106 through the internal passage 128 to a position in the diaphragm cavity 126. The second portion 150 extends from the first portion 148 through the diaphragm cavity 126 in the circumferential direction 46 to a second end 172. The first and the second portions 148, 150 of the tube 130 may be integrally coupled (i.e., formed from a single piece of tube) or formed from separate tubes joined by, e.g., welding, threaded joints, couplings, compression fittings, loose connections, etc. As best shown in FIG. 6, the tube 130 has an L-shape in some embodiments. Nevertheless, the tube 130 may have any suitable shape. As shown in FIGS. 3 and 6, the first and the second ends 146, 172 of the tube 130 may be beveled to facilitate installation in the gas turbine engine 10.

Referring now to FIGS. 4-5, the first portion 148 of the tube 130 is axially and circumferentially spaced apart from the pressure side and suction side walls 110, 112 forming the airfoil 108. As such, the one or more tubes 130 and the compressed air 38 flowing therethrough are isolated from exposure to the pressure side and the suction side walls 110, 112, which are in contact with the combustion gases 40 flowing through the turbine 24. In this respect, the compressed air 38 flowing through the one or more tubes 130 absorbs less heat and experiences a smaller temperature increase that the compressed air 38 exposed to the pressure side and suction side wall 110, 112.

As best illustrated in FIGS. 3-4, the cooling air bypass system 100 may include one or more outer plates 132, which form the radially outer boundary of the internal passage 128 defined by the airfoil 108. Each of the one or more outer plates 132 is positioned over one of the internal passages 128 through which the one or more tubes 130 extend. Specifically, each of the one or more outer plates 132 is positioned on the back side 184 of the outer band 106 and radially aligned with the corresponding airfoil 108. As shown in FIG. 4, the one or more outer plates 132 each define one or more outer plate apertures 176 extending radially therethrough. Each of the one or more tubes 130 extend through one of the outer plate apertures 176. In this respect, the outer plate apertures 176 axially and circumferentially position the radially outer portions of the first portion 148 of the tubes 130. In this respect, the outer plate 132 maintains the spaced apart relationship between the tubes 130 and the airfoil 108.

As shown in FIGS. 3-4 and 6, a frequency tuning device 134 couples each of the one or more tubes 130 to the corresponding outer plate 132. In the embodiment shown in FIGS. 3 and 6, the cooling air bypass system 100 includes four frequency tuning devices 134, one for each of the four tubes 130. Nevertheless, the cooling air bypass system 100 may include more or less frequency tuning devices 134. As will be discussed in greater detail below, the frequency tuning device 134 permits some relative radial movement between the corresponding tube 130 and the corresponding outer plate 132.

Figure 7:
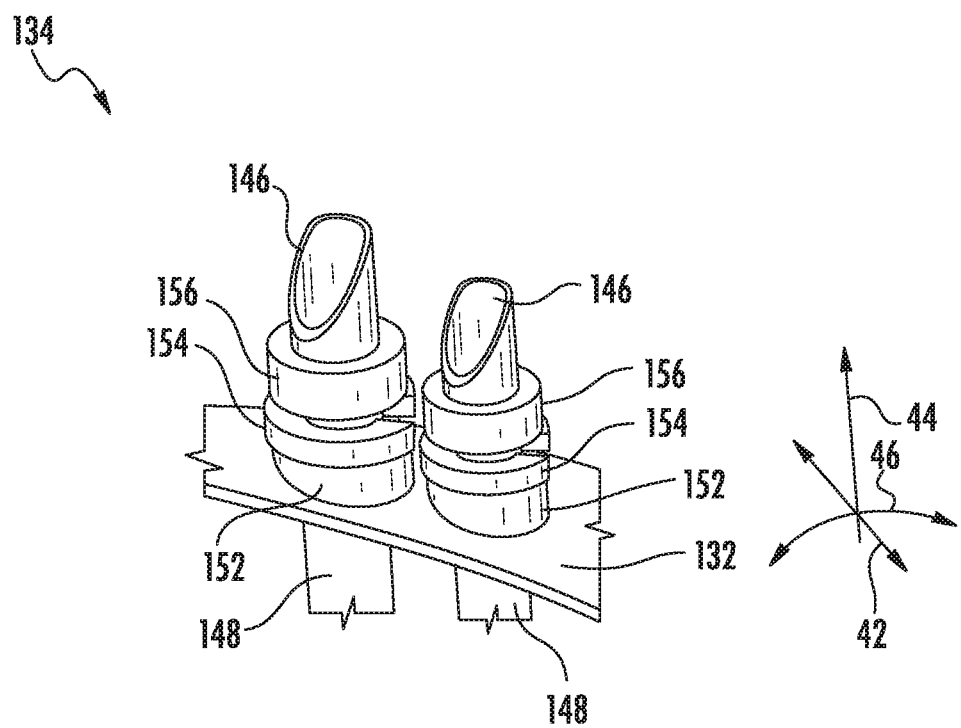
FIG. 7 is a perspective view of a frequency tuning device that includes one or more springs and one or more collars for coupling the one or more tubes to an outer plate attached to the turbine nozzle.

FIG. 7 illustrates one embodiment of the frequency tuning device 134. More specifically, the frequency tuning device 134 includes a first collar 152, a helical spring 154, and a second collar 156. The first collar 152 is positioned circumferentially around the corresponding outer plate aperture 176 on the radially outer surface of the outer plate 132 and fixedly attached thereto (e.g., via welding, etc.). The second collar 156 is positioned circumferentially around the corresponding tube 130 and fixedly attached thereto (e.g., via welding, etc.). In other embodiments, the first and the second collars 152, 156 may be removably attached to the corresponding tube 130 (e.g., via threading, etc.). As shown in FIG. 7, the second collar 156 is positioned radially outwardly from the first collar 152 and radially spaced apart therefrom. In this respect, the helical spring 154 is positioned radially between the first and the second collars 152, 156. In the embodiment shown in FIG. 7, the helical spring 154 is a split lock washer. In other embodiments, the helical spring 154 may be any other suitable helical spring.

In operation, the frequency tuning device 134 permits some relative radial movement between the corresponding tube 130 and the corresponding outer plate 132. More specifically, when the tube 130 moves radially inward relative to the outer plate 132, the second collar 156 compresses the helical spring 154 against the first collar 152. The helical spring 154 permits only a finite amount of radial movement between the tube 130 and the outer plate 132. The helical spring 154 also acts as a spring that returns the tube 130 to its original radial position relative to the outer plate 132. Furthermore, the frequency tuning device 134 may also tune the natural frequencies of the tube 130. That is, the frequency tuning device 134 drives the natural frequencies of the tube 130 out of the range of the driving frequencies of the gas turbine engine 10.

Figure 8:
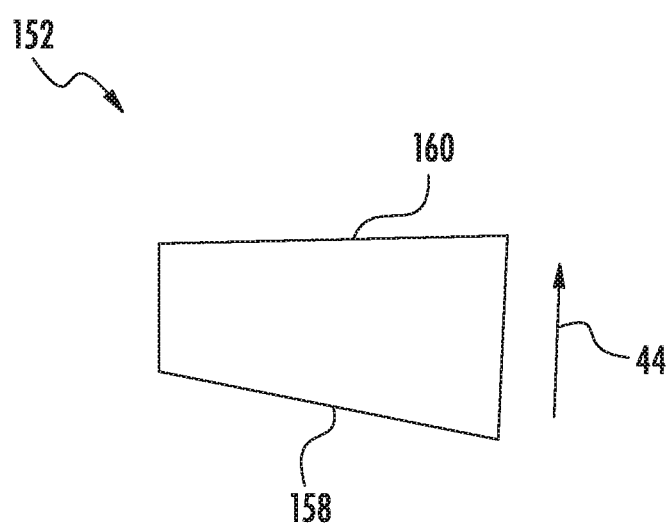
FIG. 8 is a front view of a first collar for use in the embodiment of the frequency tuning device shown in FIG. 7.

As shown in FIG. 8, the first collar 152 may include a radially inner surface 158 and a radially outer surface 160 radially spaced apart from the radially inner surface 158. In some embodiments, the radially outer surface of the outer plate 132 may be angularly oriented or curvilinear. In this respect, the radially inner surface 158 may be oriented at an angle relative to the radially outer surface 160 and/or be curvilinear to conform to the shape of the outer plate 132.

Figure 9:
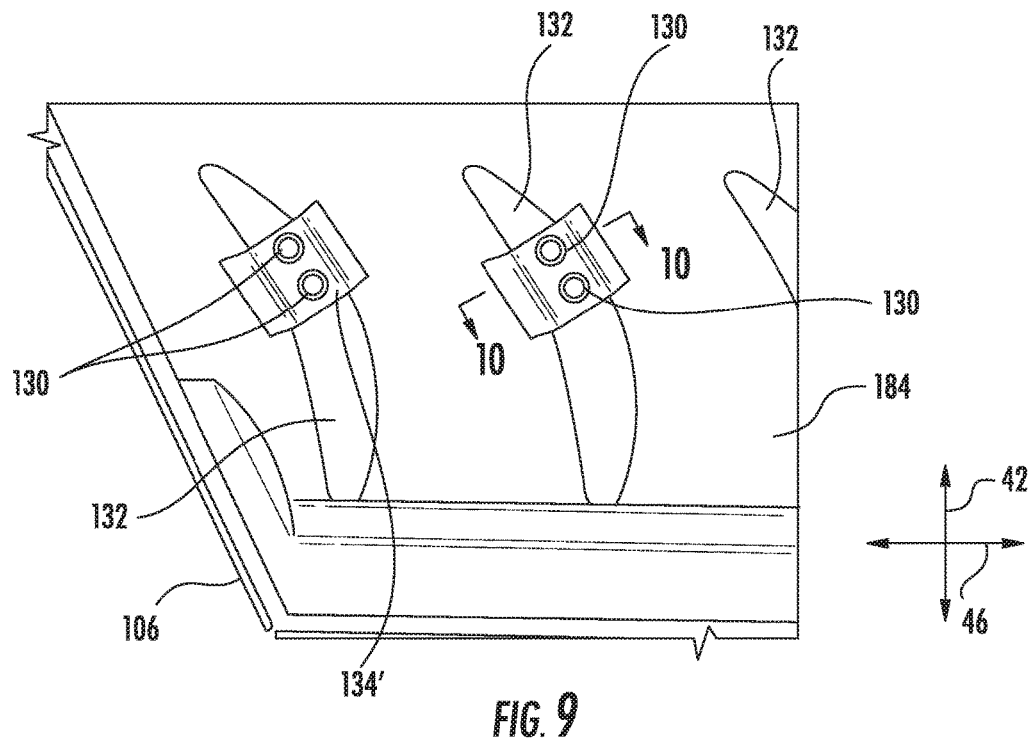
FIG. 9 is a top view of the turbine nozzle, illustrating an alternate embodiment of the frequency tuning device.
Figure 10:
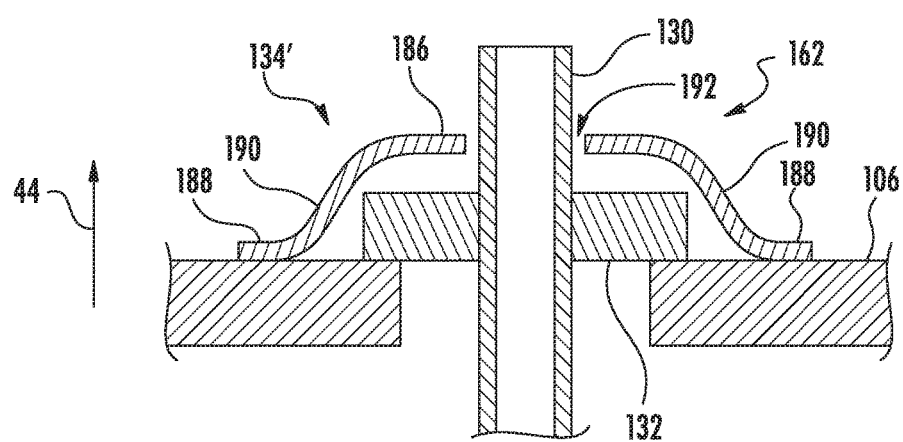
FIG. 10 is a cross-sectional view of the embodiment of the frequency tuning device shown in FIG. 9 and taken generally about line 10-10 in FIG. 9, illustrating various features thereof.

FIGS. 9-10 illustrate an alternate embodiment of the frequency tuning device 134'. More specifically, the frequency tuning device 134' is a leaf spring 162 having a radially outer portion 186 that defines an aperture 192 for receiving the tube 130. The radially outer portion 186 is oriented perpendicularly with respect to the tube 130 and fixedly coupled thereto (e.g., via welding). The radially outer portion 186 is positioned radially outwardly from and radially spaced apart from the outer plate 132. The leaf spring 162 also includes a pair of radially inner portions 188 positioned on, but not coupled to, the back side 184 of the outer band 106. A pair of radially central portions 190 integrally couples the radially outer portion 186 to the pair of the radially inward portions 188. The leaf spring 162 operates in substantially the same manner and performs substantially the same functions as the frequency tuning device 134.

The cooling air bypass system 100 may optionally include the one or more inner plates 136, which form the radially inner boundary of the internal passage 128 defined by the airfoil 108. In this respect, the inner plate 136 may at least partially demarcate the boundary between the internal passage 128 defined by the airfoil 108 and the diaphragm cavity 126. Each of the one or more inner plates 136 is positioned on the back side 180 of the inner band 104 and radially aligned with the corresponding airfoil 108. As shown in FIG. 4, the one or more inner plates 136 each define one or more inner plate apertures 174 extending radially therethrough. Each of the one or more tubes 130 extend through one of the inner plate apertures 174. In this respect, the outer plate apertures 176 axially and circumferentially position the radially inner portions of the first portion 148 of the tube 130. In this respect, the inner plate 136 assists the outer plate 132 in maintaining the spaced apart relationship between the tubes 130 and the airfoil 108.

FIGS. 6 and 11-15 illustrate various features of a manifold 138 positioned in the diaphragm cavity 126. The manifold 138 and the diaphragm 118 collectively define a manifold chamber 170 (FIG. 15) that collects the compressed air 38 exiting the second ends 172 of the tubes 130. The manifold 138 isolates the compressed air 38 exiting the tubes 130 and directs this air through the first rail aperture 166 for use in cooling the rotor shaft 26 (FIG. 1).

Figure 11:
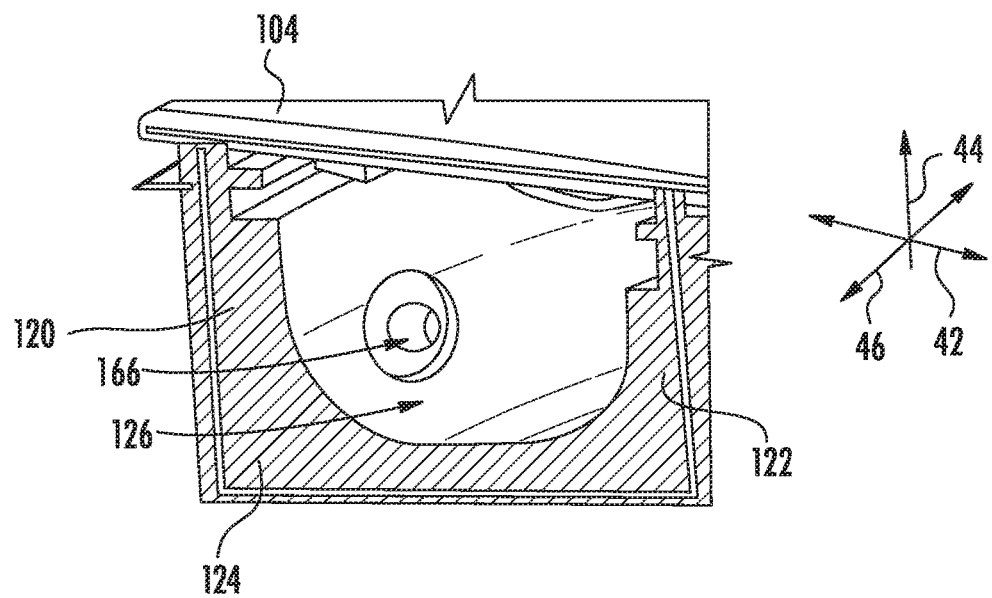
FIG. 11 is a perspective view of the diaphragm with a manifold omitted for clarity, illustrating a first rail aperture defined thereby.
Figure 12:
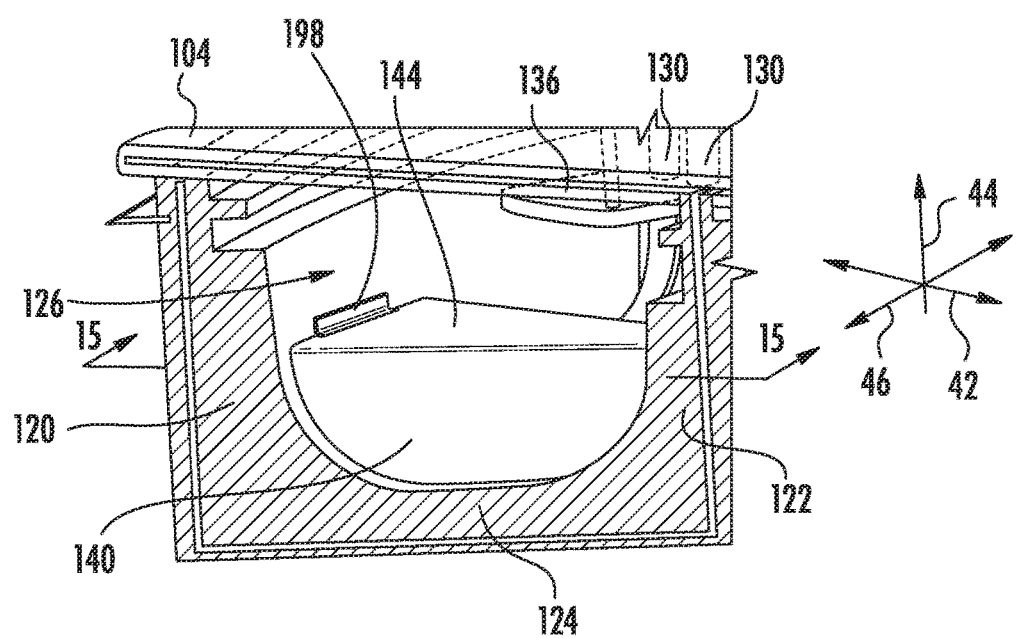
FIG. 12 is a perspective view of the diaphragm similar to FIG. 11, illustrating the positioning of the manifold.

Referring now to FIGS. 11-12, the manifold 138 is positioned in the diaphragm cavity 126 to permit fluid communication between the manifold chamber 170 and the first rail aperture 166. FIG. 11 shows the diaphragm 118 without the manifold 138 to illustrate the positioning of the first rail aperture 166 along the first rail 120. FIG. 12 illustrates the positioning of the manifold 138 within the diaphragm cavity 126. As shown, the manifold 138 encloses the first rail aperture 166, thereby providing fluid communication between the first rail aperture 166 and the manifold chamber 170.

Figure 13:
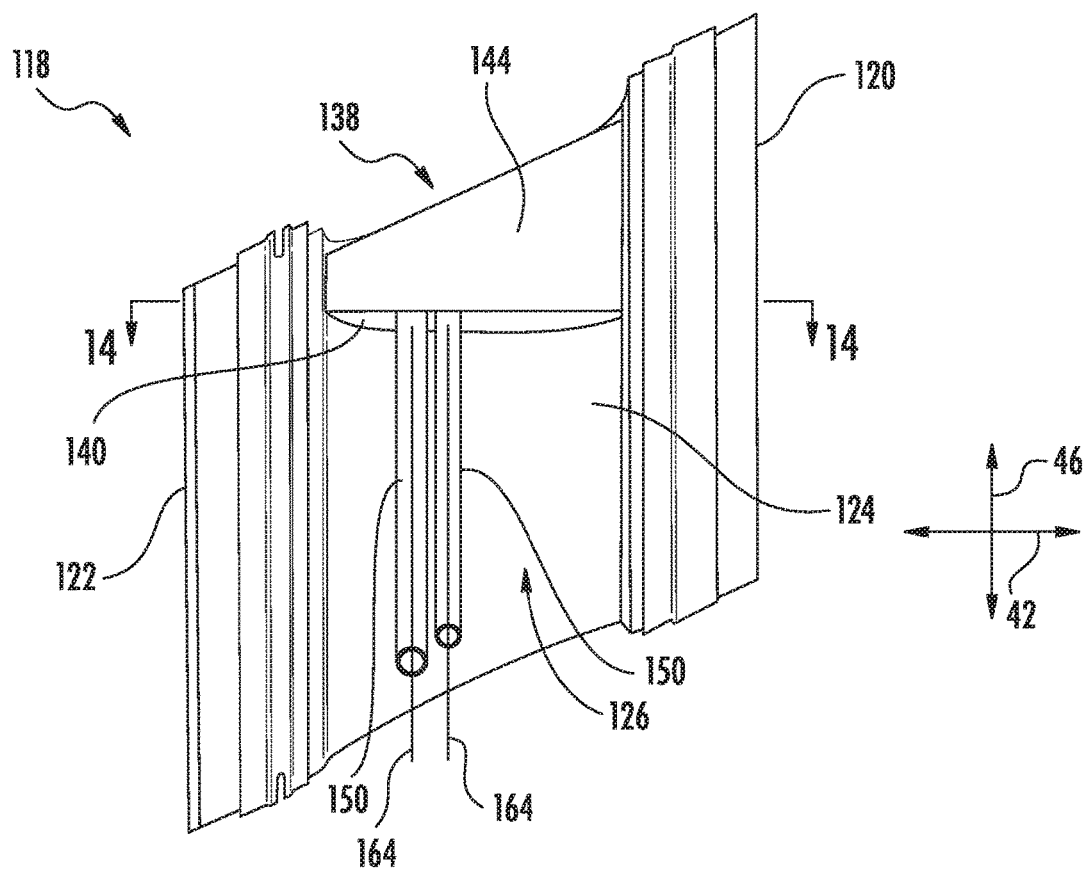
FIG. 13 is a bottom view of the diaphragm, illustrating the relative positioning of the tubes and the manifold.
Figure 14:
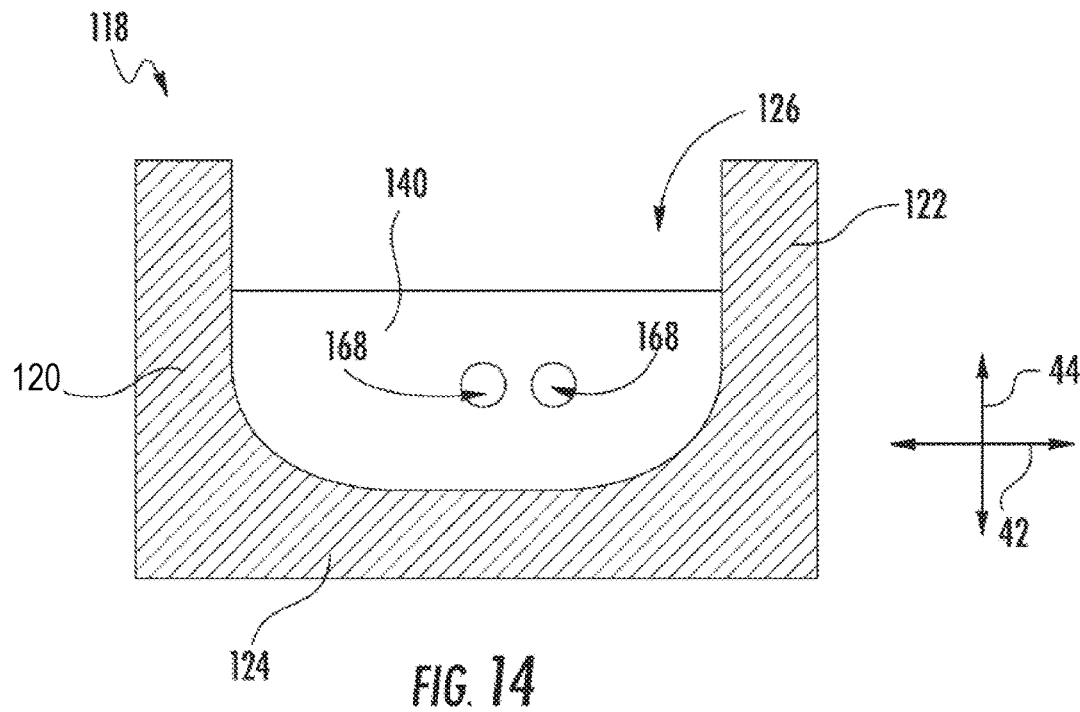
FIG. 14 is a cross-sectional view of the diaphragm taken generally about line 14-14 in FIG. 13, illustrating a pair of first wall apertures defined in a first wall of the manifold.
Figure 15:
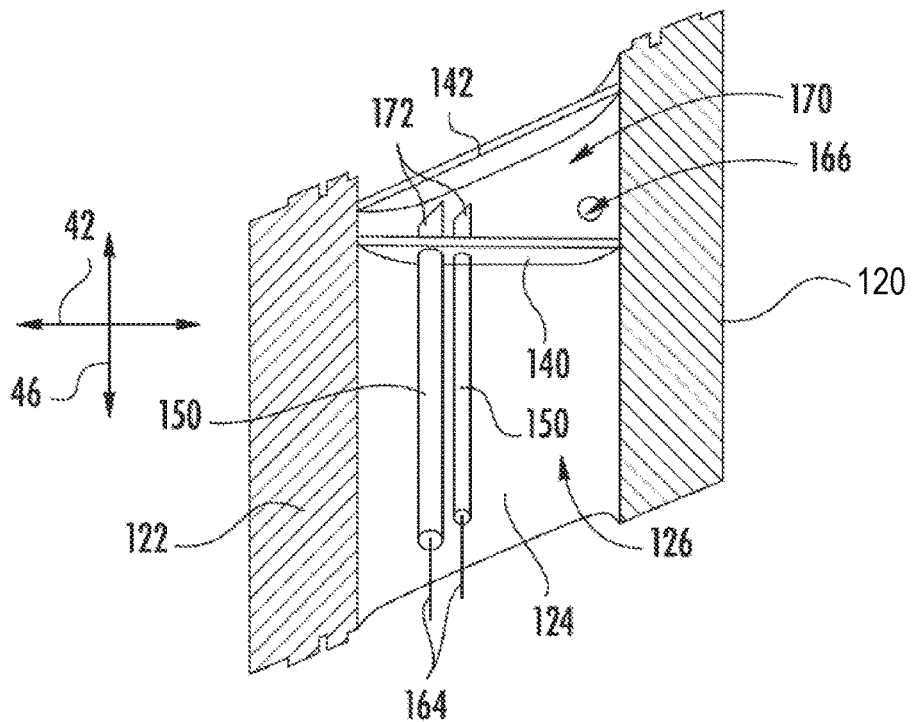
FIG. 15 is a cross-sectional view of the manifold taken generally about line 15-15 in FIG. 13, illustrating a manifold chamber defined by the manifold.

Referring now to FIGS. 12-15, the manifold 138 includes a first wall 140, a second wall 142, and a third wall 144. As shown in FIGS. 13-15, the first wall 140 extends from the first rail 120 to the second rail 122 and is in contact with the inner wall 124. The second wall 142 similarly extends from the first rail 120 to the second rail 122 and is in contact with the inner wall 124 as shown in FIGS. 12-13 and 15. The first and the second walls 140,142 conform to the shape of the diaphragm cavity 126 formed by the diaphragm 118. In the embodiment shown in FIGS. 12-15, the diaphragm 118 has a U-shape, so the first and the second walls 140, 142 also have a U-shape. Nevertheless, the first and the second walls 140, 142 may have any suitable shape that conforms to the shape of the diaphragm 118. The first and the second walls 140,142 are circumferentially spaced apart in the diaphragm cavity 126. In the embodiment shown in FIGS. 11 and 15, the second wall 142 is oriented at an angle with respect to the first wall 140. Although, the first and the second walls 140, 142 may be parallel in other embodiments. The third wall 144 extends circumferentially from the radially outer edge of the first wall 140 to the radially outer edge of the second wall 142. In some embodiments, the third wall 144 may include a lip 198 extending radially outwardly therefrom to account for manufacturing variation. The first, the second, and the third walls 140, 142, 144 may be integrally formed or may be separate components joined together via, e.g., welding.

As mentioned above, the manifold 138 and the diaphragm 118 collectively define a manifold chamber 170, which is best illustrated in FIG. 15. The manifold 138 fluidly isolates the manifold chamber 170 from the diaphragm cavity 126. In this respect, the air in the manifold chamber 170 does not mix with the air in the diaphragm cavity 126. Furthermore, only air present in the manifold chamber 170 exits through the first rail aperture 166. That is, the manifold 138 blocks air from the diaphragm cavity 126 from flowing through the first rail aperture 166.

Referring now to FIG. 13, the second portions 150 of the tubes 130 are oriented perpendicularly with respect to the first wall 140. More specifically, each of the second portions 150 of the tubes 130 defines a longitudinal axis 164 extending therethrough. The longitudinal axes 164 of the second portions 150 are oriented perpendicularly with respect to the first wall 140 of the manifold 138. Furthermore, the first wall 140 of the manifold 138 is perpendicular to the first and the second rails 120, 122 of the diaphragm 118. In this respect, the longitudinal axes 164 are parallel to the first and the second rails 120, 122.

As illustrated in FIGS. 14-15, the first wall 140 of the manifold 138 defines one or more first wall apertures 168 that provide clearance for the second portions 150 of the tubes 130. That is, the second portions 150 of the tubes 130 extend through the first wall apertures 168 to permit fluid communication between the tubes 130 and the manifold chamber 170. In the embodiment shown in FIG. 14, the first wall 140 defines two first wall apertures 168. Nevertheless, the first wall 140 may define more or less first wall apertures 168 so long as the first wall 140 defines as many first wall apertures 168 as there are tubes 130 extending through the manifold 138. The first wall apertures 168 may be positioned in any suitable arrangement along the first wall 140. For example, the first wall 140 may define two rows of the first wall apertures 168 if the tubes 130 extending through multiple airfoils 108 are in fluid communication with a single manifold 138. The third wall 144 may also include apertures (not shown) in addition to or in lieu of the first wall apertures 168.

The air bypass system 100 disclosed herein isolates rotor shaft cooling air 194 (FIG. 4) flowing through the turbine nozzle 102 from the pressure side and suction side walls 110, 112 thereof and stator vane cooling air 196 (FIG. 4). More specifically, a portion of the compressed air 38 disposed radially outwardly of the outer band 106 of the turbine nozzle 102 (FIG. 2) enters the first end 146 of the one or more tubes 130. This portion of the compressed air 38 is referred to as the rotor shaft cooling air 194. The rotor shaft cooling air 194 flows radially inward through the first portions 148 of the one or more tubes 130. In this respect, the compressed air remains isolated from the pressure side and suction side walls 110, 112 while flowing radially inwardly through the internal passage 128 of the airfoil 108. The first portions 148 of the one or more tubes 130 prevent intermixing between the rotor shaft cooling air 194 and the portion of the compressed air 38 exposed to the pressure side or suction side walls 110, 112, which is referred to as the turbine nozzle cooling air 196. The rotor shaft cooling air 194 flows through the second portions 150 of the tubes 130, thereby remaining isolated from the turbine nozzle cooling air 196 present in the diaphragm cavity 126. The rotor shaft cooling air 194 then enters the manifold chamber 170, which channels the rotor shaft cooling air 194 in the first rail aperture 166 for delivery to the rotor shaft 26 (FIG. 1). The manifold 138 isolates the rotor shaft cooling air 194 in the manifold chamber 170 from the turbine nozzle cooling air 196 present in the diaphragm cavity 126.

As discussed in greater detail above, the air bypass system 100 delivers rotor shaft cooling air 194 to the rotor shaft 26 for use in cooling the same. Since the air bypass system 100 isolates the rotor shaft cooling air 194 from the pressure side and suction side walls 110, 112, the rotor shaft cooling air 194 has lower temperature than the turbine nozzle cooling air 196 exposed to the pressure side and suction side walls 110, 112. The rotor shaft cooling air 194, by virtue of its lower temperature, provides greater cooling of the rotor shaft 26 than the turbine nozzle cooling air 196 typically used in conventional gas turbine engines to cool the rotor shaft 26. In this respect, the air bypass system 100 increases the efficiency of the gas turbine engine 10 by reducing the volume of air necessary to properly cool the rotor shaft 26.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air bypass system for a nozzle of a gas turbine engine, the air bypass system comprising:
    a nozzle comprising an inner band, an outer band, and an airfoil extending between the inner band and the outer band, the airfoil defining an internal passage;
    a diaphragm comprising an inner wall radially spaced from the inner band, a first rail extending radially between the inner wall and the inner band, and a second rail opposite the first rail and extending radially between the inner wall and the inner band; wherein the inner wall, the first rail, and the second rail collectively define a diaphragm cavity radially inward of the inner band, and wherein the first rail defines a first rail aperture;
    a manifold positioned in the diaphragm cavity, the manifold comprising a first wall extending from the first rail to the second rail and in contact with the inner wall of the diaphragm, a second wall extending from the first rail to the second rail and in contact with the inner wall of the diaphragm, and a third wall coupled to the first wall and the second wall and extending from the first rail to the second rail, wherein the first wall defines a first wall aperture; and wherein the manifold and the diaphragm collectively define a manifold chamber in fluid communication with the first rail aperture; and
    a tube extending through the internal passage defined by the airfoil, through the first wall aperture, and into the diaphragm cavity, the tube being in fluid communication with the manifold chamber;
    wherein compressed air flows through the tube into the manifold chamber and exits the manifold chamber through the first rail aperture.

2. The air bypass system of claim 1, wherein the airfoil comprises a pressure side wall and a suction side wall connected to the pressure side wall at leading edge and a trailing edge, and wherein the tube is spaced apart from the pressure side wall and the suction side wall within the internal passage.

3. The air bypass system of claim 1, wherein the tube comprises a first portion and a second portion, and wherein the first portion is oriented in a radial direction and the second portion is oriented in a circumferential direction.

4. The air bypass system of claim 3, wherein the second portion of the tube defines a longitudinal axis oriented parallel to the first rail and the second rail and perpendicular to the first wall of the manifold.

5. The air bypass system of claim 1, wherein the manifold chamber is fluidly isolated from the diaphragm cavity.

6. The air bypass system of claim 1, further comprising:
an inner plate positioned radially inward from and in contact with the inner band, the inner plate defining an inner plate aperture through which the tube extends.

7. The air bypass system of claim 1, wherein the tube comprises a first end and a second end, and wherein the first end and the second end of the tube are beveled.

8. The air bypass system of claim 1, wherein the tube is one of a plurality of tubes extending through the internal passage defined by the airfoil and into the diaphragm cavity, each tube of the plurality of tubes being in fluid communication with the manifold chamber.

9. A gas turbine comprising:
a compressor section;
a combustion section downstream of the compressor section; and
a turbine section downstream of the combustion section, the turbine section comprising:
  a nozzle comprising an inner band, and outer band, and an airfoil extending between the inner band and the outer band, the airfoil defining an internal passage;
  a diaphragm comprising an inner wall radially spaced from the inner band, a first rail extending radially between the inner wall and the inner band, and a second rail opposite the first rail and extending radially between the inner wall and the inner band;
  wherein the inner wall, the first rail, and the second rail collectively define a diaphragm cavity radially inward of the inner band, and wherein the first rail defines a first rail aperture;
  a manifold positioned in the diaphragm cavity, the manifold comprising a first wall extending from the first rail to the second rail and in contact with the inner wall of the diaphragm, a second wall extending from the first rail to the second rail and in contact with the inner wall of the diaphragm, and a third wall coupled to the first wall and the second wall and extending from the first rail to the second rail, wherein the first wall defines a first wall aperture; and wherein the manifold and the diaphragm collectively define a manifold chamber in fluid communication with the first rail aperture; and
  a tube extending through the internal passage defined by the airfoil, through the first wall aperture, and into the diaphragm cavity, the tube being in fluid communication with the manifold chamber;
  wherein compressed air flows through the tube into the manifold chamber exits the manifold chamber through the first rail aperture.

10. The gas turbine of claim 9, wherein the airfoil comprises a pressure side wall and a suction side wall connected to the pressure side wall at leading edge and a trailing edge, and wherein the tube is spaced apart from the pressure side wall and the suction side wall within the internal passage.

11. The gas turbine of claim 9, wherein the first wall is oriented perpendicularly with respect to the first rail and the second rail.

12. The gas turbine of claim 11, wherein the tube comprises a first portion and a second portion, and wherein the first portion is oriented in a radial direction and the second portion defines a longitudinal axis oriented parallel to the first rail and the second rail and perpendicular to the first wall of the manifold.

* * * * *